United States Patent
Ranford et al.

(10) Patent No.: US 8,294,683 B2
(45) Date of Patent: Oct. 23, 2012

(54) METHOD OF PROCESSING TOUCH COMMANDS AND VOICE COMMANDS IN PARALLEL IN AN ELECTRONIC DEVICE SUPPORTING SPEECH RECOGNITION

(75) Inventors: Paul Ranford, Auckland (NZ); Hrvoje Muzina, Auckland (NZ)

(73) Assignee: Mitac International Corp., Kuei-Shan Hsiang, Tao-Yuan Hsien (TW)

( * ) Notice: Subject to any disclaimer, the term of this patent is extended or adjusted under 35 U.S.C. 154(b) by 571 days.

(21) Appl. No.: 12/566,670

(22) Filed: Sep. 25, 2009

(65) Prior Publication Data

US 2011/0074693 A1    Mar. 31, 2011

(51) Int. Cl.
*G06F 3/041* (2006.01)
(52) U.S. Cl. ......... 345/173; 704/231; 704/275; 701/538
(58) Field of Classification Search .................. None
See application file for complete search history.

(56) References Cited

U.S. PATENT DOCUMENTS

| 2010/0105364 A1* | 4/2010 | Yang | 455/414.1 |
| 2010/0250248 A1* | 9/2010 | Willins | 704/235 |
| 2011/0022393 A1* | 1/2011 | Waller et al. | 704/270 |

* cited by examiner

*Primary Examiner* — Andrew L Sniezek
(74) *Attorney, Agent, or Firm* — Winston Hsu; Scott Margo

(57) ABSTRACT

A method of processing touch commands and voice commands in parallel in an electronic device supporting speech recognition includes detecting a touch-down event on a touch-sensitive screen of the electronic device when touch input is sensed on the touch-sensitive screen, the touch-sensitive screen displaying one or more soft buttons, each soft button executing a corresponding command upon activation of the soft button. A microphone of the electronic device is activated to receive voice instructions in response to detecting the touch-down event. A touch-up event is detected when touch input is no longer sensed on the touch-sensitive screen, and it is determined whether a voice command was detected in a time period between the touch-down event and the touch-up event. The voice command is then executed if the voice command was detected.

18 Claims, 3 Drawing Sheets

METHOD OF PROCESSING TOUCH COMMANDS AND VOICE COMMANDS IN PARALLEL IN AN ELECTRONIC DEVICE SUPPORTING SPEECH RECOGNITION

BACKGROUND OF THE INVENTION

1. Field of the Invention

The invention relates to a speech recognition systems, and more particularly, to a method and related device for processing touch commands on a touch-sensitive screen and voice commands in parallel.

2. Description of the Prior Art

Global Positioning System (GPS) based navigation devices are well known and are widely employed as in-car navigation devices. Common functions of a navigation device include providing a map database for generating navigation instructions that are then shown on a display of the navigation device. These navigation devices are often mounted on or in the dashboard of a vehicle using a suction mount or other mounting means.

The term "navigation device" refers to a device that enables a user to navigate to a pre-defined destination. The device may have an internal system for receiving location data, such as a GPS receiver, or may merely be connectable to a receiver that can receive location data. The device may compute a route itself, or communicate with a remote server that computes the route and provides navigation information to the device, or a hybrid device in which the device itself and a remote server both play a role in the route computation process. Personal GPS navigation devices are not permanently integrated into a vehicle but instead are devices that can readily be mounted in or otherwise used inside a vehicle. Generally (but not necessarily), they are fully self-contained—i.e. include an internal GPS antenna, navigation software and maps and can hence plot and display a route to be taken.

A prior art personal navigation devices typically has a touch-sensitive screen for accepting touch input from a user. In addition, the personal navigation device may also have a microphone for accepting voice input from the user, as well as a speech recognition engine for processing the voice input and determining whether a voice command was given to the personal navigation device.

A common problem with speech recognition systems is that they need endpoint indicators at the beginning and the ending of the voice commands so that the speech recognition systems can focus only on the relevant phrases of the speech. In noisy environments such as in a vehicle, the large amount of noise caused by the vehicle, the radio, or by talking passengers makes it difficult for a personal navigation device to properly and correctly analyze voice commands. For this reason, many personal navigation devices allow the user to indicate when the voice command is about to start and when it has ended.

With some devices, a special button is used to tell the device when the voice command has started or has ended. In the case of a personal navigation device, the user may also communicate with the personal navigation device via a remote control. However, using a remote control or an extra button on the device makes the product significantly more expensive. Furthermore, using a soft button on the screen of the personal navigation device is not ideal because the user needs the soft button to have a large area, so as to make for a large target, since the user is operating the personal navigation device while driving. In addition, requiring the user to search for a special soft button on the screen before issuing the voice command defeats the objective of speech recognition if the user is distracted by the process of entering the voice command.

Using an on-screen soft button is also prone to error if the screen has other functions that can be performed which may be inadvertently pressed. This may cause the user to have to spend even more time reversing or undoing commands that were mistakenly made, leading to a more dangerous situation while the user is driving.

Therefore, there is a need for a simple and cost effective way for a user to indicate endpoints before and after a voice command without the need for accuracy in pressing a soft button or a costly hardware button while still allowing the use of the screen for command entry in the case that the user is not occupied with other tasks.

SUMMARY OF THE INVENTION

It is therefore one of the primary objectives of the claimed invention to provide a method and related device allowing both touch and voice commands to control a device concurrently.

According to an exemplary embodiment of the claimed invention, a method of processing touch commands and voice commands in parallel in an electronic device supporting speech recognition is disclosed. The method includes detecting a touch-down event on a touch-sensitive screen of the electronic device when touch input is sensed on the touch-sensitive screen, the touch-sensitive screen displaying one or more soft buttons, each soft button executing a corresponding command upon activation of the soft button. A microphone of the electronic device is activated to receive voice instructions in response to detecting the touch-down event. A touch-up event is detected when touch input is no longer sensed on the touch-sensitive screen, and it is determined whether a voice command was detected in a time period between the touch-down event and the touch-up event. The voice command is then executed if the voice command was detected.

According to another exemplary embodiment of the claimed invention, an electronic device for processing touch commands and voice commands in parallel is disclosed. The electronic device includes a processor for controlling operation of the electronic device and a touch-sensitive screen for detecting a touch-down event when touch input is sensed on the touch-sensitive screen, the touch-sensitive screen displaying one or more soft buttons, and the processor executing a corresponding command upon activation of each soft button. A microphone is used for receiving voice instructions when the microphone is activated by the processor in response to the processor detecting the touch-down event and before a touch-up event is detected by the processor when touch input is no longer sensed on the touch-sensitive screen. A speech recognition module is used for determining whether a voice command was detected in a time period between the touch-down event and the touch-up event, wherein the processor executes the voice command if the voice command was detected.

It is an advantage that the present invention provides a convenient way to receive both voice commands and touch commands at the same time. The user of the electronic device can touch any part of the touch-sensitive screen for issuing a voice command, and does not have to spend time searching for a special button on the electronic device. The claimed electronic device provides the user with a way to give instructions to the electronic device without the user being distracted from their current task.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
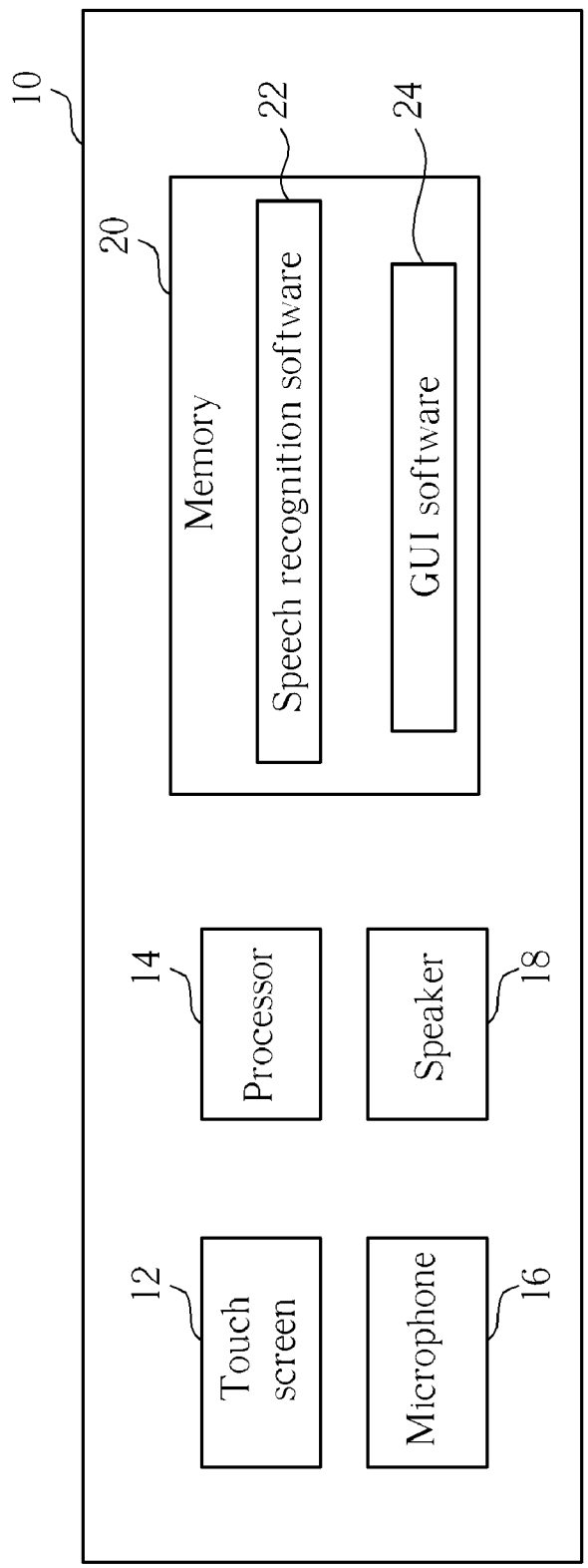
FIG. 1 is a functional block diagram of an electronic device capable of processing touch commands and voice commands in parallel according to the present invention.

Please refer to FIG. 1. FIG. 1 is a functional block diagram of an electronic device 10 capable of processing touch commands and voice commands in parallel according to the present invention. The electronic device 10 may be a personal navigation device, but is not limited to this, and may be any device that is capable of recognizing voice commands and receiving touch input on a touch-sensitive screen. As shown in FIG. 1, the electronic device 10 contains a touch-sensitive screen 12 for displaying images and receiving touch input from a user. The electronic device 10 also includes a microphone 16 for receiving voice input from the user as well as a speaker 18 for outputting audio signals. A processor 14 is used for controlling operation of the electronic device 10, and executes speech recognition software 22 and graphical user interface software 24 stored in memory 20.

In the present invention, the user gives endpoint indicators to the electronic device 10 to indicate when a voice command is about to begin and to indicate when the voice command has ended. To minimize the distraction that these endpoint indicators may cause for the user, the present invention allows the user to press and hold anywhere on the touch-sensitive screen 12 for the duration of the voice command. That is, when the user is about to speak the voice command, the user will press somewhere on the touch-sensitive screen 12 without letting go. This event will be referred to as a touch-down event since the user has touched down on the touch-sensitive screen 12 and touch input is sensed on the touch-sensitive screen 12. After the touch-down event has occurred, the microphone 16 is activated for receiving voice commands and the user may issue a voice command through though the microphone 16. Next, after the user has finished with the voice command, the user can let go of the touch-sensitive screen 12 by moving his fingers off of the touch-sensitive screen 12. This event is referred to as a touch-up event since the fingers are moved up and off of the touch-sensitive screen 12 and touch input is no longer sensed on the touch-sensitive screen 12.

All speech received between the touch-down event and the touch-up event is analyzed by the speech recognition software 22 that is executed by the processor 14. In this way, the touch-down event and the touch-up event serve as endpoints for limiting the speech recognition to be performed only during this time period.

Figure 2:
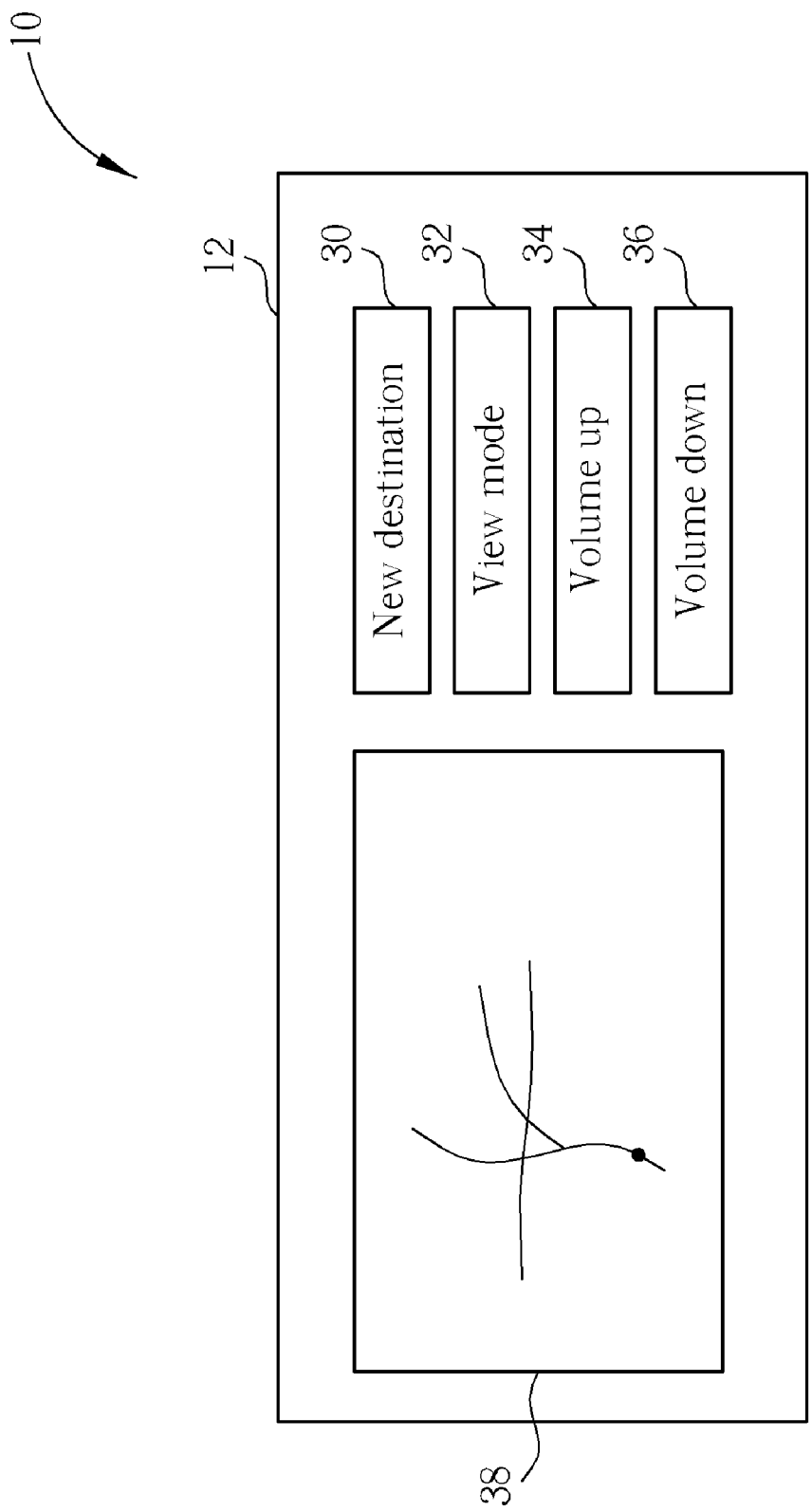
FIG. 2 is a sample screenshot of the touch-sensitive screen.

Please refer to FIG. 2. FIG. 2 is a sample screenshot of the touch-sensitive screen 12. In this example, the electronic device 10 is assumed to be a personal navigation device. Therefore, the touch-sensitive screen 12 displays a navigation map 38 showing the position of the electronic device 10 with respect to roads on a map as well as other soft buttons 30, 32, 34, and 36. Each of the soft buttons 30, 32, 34, and 36, if pressed, issues a touch command to the electronic device 10 that executes an action associated with the button. The action associated with each of the soft buttons 30, 32, 34, and 36 will be referred to as a button action in the following description. As examples, soft button 30 lets the user add a new destination for requesting navigation instructions from the electronic device 10. Soft button 32 changes the viewing mode of the electronic device 10, and soft buttons 34 and 36 respectively increase or decrease the volume of audio signals output through the speaker 18.

If the electronic device 10 is a personal navigation device, examples of common voice commands that can be given include "Go to . . . (a named destination or an address)", "repeat that", "ETA" (estimated time of arrival), or "distance to go". These voice commands do not require the user to look at soft buttons on the touch-sensitive screen 12. For this reason, the present invention method of allowing the user to press anywhere on the touch-sensitive screen 12 prevents the user from having to look at the electronic device 10 for an extended amount of time.

Since the user is allowed to press anywhere on the touch-sensitive screen 12 for triggering the touch-down event, it is possible that the user may press a location on the touch-sensitive screen 12 that is associated with a particular button action. The simplest case is when the user touches a location of the touch-sensitive screen 12 that does not have a soft button. In this case, the touch-down event cannot perform any button action, and it is assumed that the touch-down event is used to indicate the start of a voice command. On the other hand, if the user touches a location of the touch-sensitive screen 12 that has a soft button, then the associated button down action is executed while audio commands are being sent to the speech recognition software 22 executed by the processor 14. Since it is possible that this touch-down event was not intended to perform the button down action, and was instead intended to indicate the start of the voice command, this button down action needs to be an action that can be undone or reversed.

If the speech recognition software 22 recognizes the voice command that is valid in the current operating state of the electronic device 10, then any reversible button actions that were performed are reversed and the voice command is executed instead. On the other hand, the present invention can also delay the execution of the button action until the speech recognition software 22 is sure that no valid voice command was given or recognized. In this situation, the processor 14 can delay executing the button action until the touch-up event has occurred and no voice command was recognized between the touch-down event and the touch-up event. In other words, the present invention can execute the button action immediately upon receiving the touch-down event and later reverse the button action, if necessary, when a voice command is recognized. Alternatively, execution of the button action can be delayed until after the touch-up event when it is determined that no voice command was actually given.

A timer can also be started when the touch-down event is received. If a touch-up event has not occurred after the time has expired, such as after 5 or 10 seconds, then voice command entry is assumed, and any button action associated with the touch-down event is ignored or undone.

If the user moves their finger when it is in contact with the touch-sensitive screen 12 and drags the finger across the touch-sensitive screen 12, an associated action may be performed such as panning or stretching the screen. The screen can be updated as the action takes place, but the action must still be reversible if a voice command is later recognized.

An indicator can also be displayed on the screen to show that voice analysis is in progress. The indicator can be shown upon detecting the touch-down event and can be removed when detecting the touch-up event. Otherwise, the indicator can be removed after determining that no audio command has been recognized.

Figure 3:
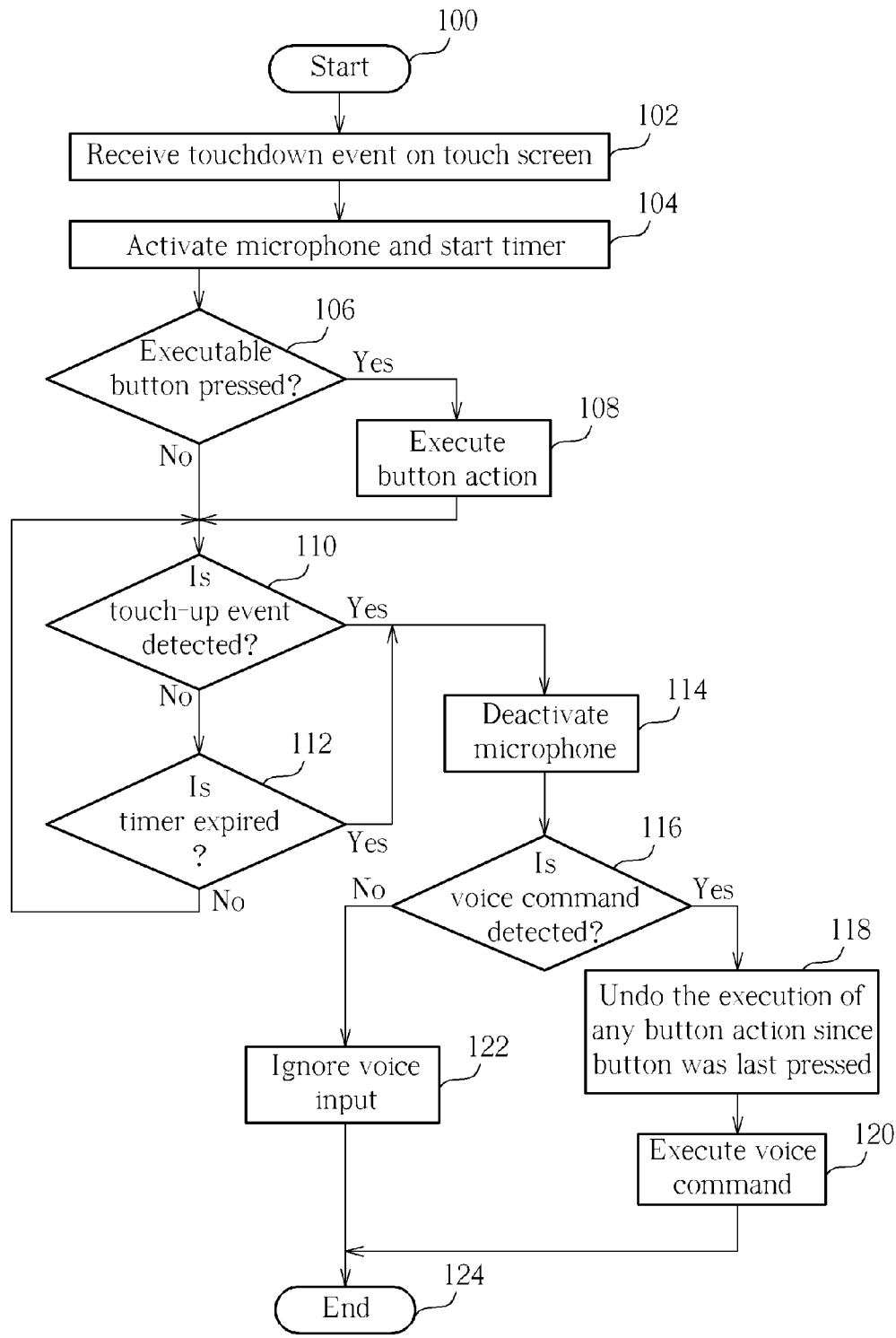
FIG. 3 is a illustrating the present invention method of concurrently recognizing touch commands and voice commands.

Please refer to FIG. 3. FIG. 3 is a illustrating the present invention method of concurrently recognizing touch commands and voice commands. Steps contained in the flowchart will be explained below.

Step 100: Start.

Step 102: Receive a touch-down event on the touch-sensitive screen 12.

Step 104: Activate the microphone 16 and start the timer in response to receiving the touch-down event.

Step 106: Determine if an executable soft button was pressed during the touch-down event. If so, go to step 108. If not, go to step 110.

Step 108: Execute the button action associated with the soft button. Alternatively, execution of the button action can be delayed until after determining that no voice command was recognized.

Step 110: Determine if a touch-up event is detected. If so, go to step 114. Otherwise, go to step 112.

Step 112: Determine if the timer has expired. If so, go to step 114. Otherwise, go back to step 110.

Step 114: Deactivate the microphone 16 since voice input is no longer being analyzed.

Step 116: Determine if a voice command was detected and recognized. If so, go to step 118. Otherwise, go to step 122.

Step 118: Undo execution of any button action that was performed as a result of the touch-down event. If no button action was performed, this step can be skipped.

Step 120: Execute the recognized voice command, and go to step 124.

Step 122: Ignore the voice input since no voice command was recognized.

Step 124: End.

In summary, the present invention provides a way to process both touch commands and voice commands in parallel. Advantageously, the user of the electronic device can touch any part of the touch-sensitive screen for issuing a voice command, and does not have to spend time searching for a special button on the electronic device. Therefore, the user of the electronic device is less distracted from the task at hand when the user gives voice commands. In addition, the electronic device can focus on analyzing voice commands given between the touch-down and touch-up events, thereby increasing the accuracy of the speech recognition while also saving processing resources.

Those skilled in the art will readily observe that numerous modifications and alterations of the device and method may be made while retaining the teachings of the invention.

What is claimed is:

1. A method of processing touch commands and voice commands in parallel in an electronic device supporting speech recognition, the method comprising:
   detecting a touch-down event on a touch-sensitive screen of the electronic device when touch input is sensed on the touch-sensitive screen, the touch-sensitive screen displaying one or more soft buttons, each soft button executing a corresponding command upon activation of the soft button;
   determining that one of the soft buttons was activated through the touch-down event; and
   activating a microphone of the electronic device to receive voice instructions in response to detecting the touch-down event;
   detecting a touch-up event when touch input is no longer sensed on the touch-sensitive screen;
   determining whether a voice command was detected in a time period between the touch-down event and the touch-up event, and executing the voice command if the voice command was detected; and
   executing a command corresponding to the soft button activated by the touch event in response to detecting the touch-up event and in response to determining that a voice command was not detected in the time period between the touch-down event and the touch-up event.

2. The method of claim 1 further comprising:
   undoing execution of the command corresponding to the soft button activated by the touch event in response to determining that the voice command was detected.

3. The method of claim 1 further comprising:
   starting a timer in response to detecting the touch-down event; and
   undoing execution of the command corresponding to the soft button activated by the touch event in response to expiration of the timer.

4. The method of claim 3 further comprising:
   displaying an indicator on the touch-sensitive screen that the microphone is receiving voice instructions in response to detecting the touch-down event; and
   stopping displaying the indicator in response to expiration of the timer.

5. The method of claim 1 further comprising:
   displaying an indicator on the touch-sensitive screen that the microphone is receiving voice instructions in response to detecting the touch-down event; and
   stopping displaying the indicator in response to detecting the touch-up event.

6. The method of claim 1, wherein the touch-down event is detected when any touch-sensitive part of the touch-sensitive screen is pressed.

7. The method of claim 1 further comprising deactivating the microphone in response to detecting the touch-up event.

8. The method of claim 1, wherein the electronic device is a personal navigation device.

9. The method of claim 1, wherein execution of commands corresponding to the soft buttons is undoable.

10. An electronic device for processing touch commands and voice commands in parallel, comprising:
    a processor for controlling operation of the electronic device;
    a touch-sensitive screen for detecting a touch-down event when touch input is sensed on the touch-sensitive screen, the touch-sensitive screen displaying one or more soft buttons, and the processor executing a corresponding command upon activation of each soft button;
    a microphone for receiving voice instructions when the microphone is activated by the processor in response to the processor detecting the touch-down event and before a touch-up event is detected by the processor when touch input is no longer sensed on the touch-sensitive screen; and
    a speech recognition module for determining whether a voice command was detected in a time period between the touch-down event and the touch-up event, wherein the processor executes the voice command if the voice command was detected,
    wherein the processor determines that one of the soft buttons was activated through the touch-down event and executes a command corresponding to the soft button activated by the touch event in response to detecting the touch-up event and in response to determining that a voice command was not detected in the time period between the touch-down event and the touch-up event.

11. The electronic device of claim 10, wherein the processor undoes execution of the command corresponding to the soft button activated by the touch event in response to determining that the voice command was detected.

12. The electronic device of claim 10, wherein the processor starts a timer in response to detecting the touch-down event and undoes execution of the command corresponding to the soft button activated by the touch event in response to expiration of the timer.

13. The electronic device of claim 12, wherein the processor controls the touch-sensitive screen to display an indicator that the microphone is receiving voice instructions in response to detecting the touch-down event, and controls the touch-sensitive screen to stop displaying the indicator in response to expiration of the timer.

14. The electronic device of claim 10, wherein the processor controls the touch-sensitive screen to display an indicator that the microphone is receiving voice instructions in response to detecting the touch-down event, and controls the touch-sensitive screen to stop displaying the indicator in response to detecting the touch-up event.

15. The electronic device of claim 10, wherein the touch-down event is detected when any touch-sensitive part of the touch-sensitive screen is pressed.

16. The electronic device of claim 10, wherein the processor deactivates the microphone in response to detecting the touch-up event.

17. The electronic device of claim 10, wherein the electronic device is a personal navigation device.

18. The electronic device of claim 10, wherein execution of commands corresponding to the soft buttons is undoable.

* * * * *